United States Patent [19]

Gal

[11] Patent Number: 4,856,597

[45] Date of Patent: Aug. 15, 1989

[54] SOIL WORKING MACHINE

[75] Inventor: Shmuel Gal, Tel Aviv, Israel

[73] Assignee: Shoshana RAM, Jerusalem, Israel

[21] Appl. No.: 65,549

[22] Filed: Jun. 24, 1987

[30] Foreign Application Priority Data

Jul. 9, 1986 [IL] Israel ........................................ 79366

[51] Int. Cl.⁴ .............................................. A01B 9/00
[52] U.S. Cl. ....................................... 172/33; 172/63;
 172/156; 172/192; 172/514
[58] Field of Search ...................... 172/33, 192, 63, 67,
 172/156, 26, 155, 158, 159, 167, 414, 716, 717

[56] References Cited

U.S. PATENT DOCUMENTS

| 4,382,472 | 5/1983 | Van der Lely | 172/33 |
| 4,494,611 | 1/1985 | Alvarez | 172/32 |
| 4,541,491 | 9/1985 | Van der Lely | 172/33 |

FOREIGN PATENT DOCUMENTS

| 3404675 | 1/1982 | Fed. Rep. of Germany . |
| 3201821 | 2/1984 | Fed. Rep. of Germany . |
| 0388686 | 11/1973 | U.S.S.R. . |
| 0782731 | 11/1980 | U.S.S.R. . |
| 869831 | 10/1958 | United Kingdom . |

Primary Examiner—Deborah L. Kyle
Assistant Examiner—J. Woodrow Eldred
Attorney, Agent, or Firm—Beveridge, DeGrandi & Weilacher

[57] ABSTRACT

A soil preparation machine is pulled by a tractor across a field in which rows of plants and tracks followed by the tractor are at permanent locations from season to season. Soil from between the remains of two rows of the previous season's plants is lifted by a blade and delivered to the forward end of a belt conveyor which is slanted rearwardly and upwardly. Devices on the machine upturn the remains of the previous season's plants and the soil beneath them. Soil falls from the rear end of the conveyor onto the upturned remains. The blade and conveyor are narrower than the distance between the rows of plants, and the upturning devices are aligned with the rows of plants inboard of the tractor tracks.

10 Claims, 3 Drawing Sheets

SOIL WORKING MACHINE

The present invention relates to a soil working machine.

As background for the invention it is hereby explained that a regular cultivating agricultural cycle is common for most of plants grown in rows.

A regular agricultural cycle usually includes the following stages:
  clearing or destroying the remains of the last season's plants;
  Preparation of the soil for ploughing, in case the soil is not sufficiently level;
  Ploughing-turning the soil over whilst burying the remains of the former plants and aerating the soil-breaking down lumps of pressed soil;
  Levelling—levelling the soil by means of levelling means;
  Marking the area into beds or rows;
  Preparation of seed bedding—crumbling the soil;
  Sowing and growing, including watering, spraying, etc;
  Harvesting; and so on repeatedly.

According to the customary method the soil is ploughed at the beginning of the season in preparation for the new sowing. Most of the soil-growings are sown in rows in order to enable cultivation by mechanical means during the season. Such means are towed by a tractor which travels on a soil strip which remains constant throughout the season (hereafter "a track"), which causes over-pressing of the track soil. During conventional ploughing the clods are moved over to one side and as a result, the tractor's track from the previous season is turned into growth area for the new season and therefore there arises a necessity to crumble also the soil of the pressed, previous seaon's track soil, which causes difficulties. Therefore, machines for preparation of the soil have been developed which machines do not move the clods over to the side, and the growth area and track of the tractor remain fixed from one season to the next one. One such machine has been described, e.g., in German Patent Specification No. 23 59 468 in which the machine lifts a soil layer by a blade and transfers this layer to a device which crumbles the same and is situated right behind said blade. This machine is practically a soil breaking-up machine and use thereof in the above-described cultivating cycle is at the stage of preparing the seeds bedding.

In German Patent Specification No. 23 44 625 the lifted soil layer is directly transferred to a breaking-up device by a rolling cylinder.

The presently claimed soil cultivating machine performs the following actions. It should be emphasized that both the bed and the plants rows remain in the area between the tractor wheels tracks which, as stated, are pressed and remain permanent from one season to the next one.

The machine subject of the invention lifts a soil layer while forming a furrow between two plant rows, lifts and transfers this soil layer by means of a conveyor to a place near the rearmost end thereof, upturns the stems and other remains of the last season's plants together with the soil underneath the same by means which protrude over the sides of the furrow and thus the stems and others remains of the last season's plants are buried under the soil which is transferred by the conveyor and the bed is filled with soil and becomes ready for sowing.

The machine may optionally comprise means for adjusting the height of the rearmost end of the conveyor to a desired height above the bed.

Optionally, the machine may be equipped with additional means for bending the stems and other remains of the plants before upturning the same with the soil underneath them. Optionally, the machine may be also equipped with two cutting-discs, on both sides of said blade, in order to more sharply define the width of the furrow and at the rearmost end of the machine it is possible to install means for levelling the bed surface. In addition it is possible to optionally install on the machine means for fertilizing the bed.

The means for bending the stems inwardly and upturning the soil underneath may be discs which are mounted at an angle to the travelling direction or the blades of a plough.

Therefore, the claimed invention relates to a machine for preparing the soil surface for sowing of plants grown in rows, whilst burying the remains of the last season's plants in a method in which the tractor travels on a fixed track which remains at a fixed place from season to season and also the rows or plants are permanent from one season to the next one the machine comprising:

1. A frame attached to a tractor;
2. A blade held on said frame, at a direction perpendicular to the travelling direction of the machine, slanting forwardly at the travelling direction and reaching the desired soil-cultivating depth;
3. A diagonal belt conveyor along the entire length of the machine, one end of said conveyor being low close to the upper edge of the said blade, the other end of the conveyor being above the desired bed height, the widths of the said blade and conveyor being smaller than the distance between the rows of growings;
4. Means for upturning the last seasons's remains of the plants together with the soil underneath the same, held on said frame, overlapping the areas of plants rows but not reaching the permanent track of the tractor and situated before the rearmost end of said conveyor.

The advantages of the method applied by the claimed machine over the conventional method are that the place of the rows of plants and the place of the pressed tractor travelling track remain fixed and, in addition, contrary to the conventional method in which the desired result is obtained by multiple operations, in the method of the presently claimed machine the desired soil working is achieved by practically a single operation.

The advantage of the claimed machine is greater also over the aforementioned prior art in that the claimed machine also uniformly buries the remains of the former plants in the ground and this assists in uniform fertilization of the soil. It is however noted in this connection that the stems and other remains of the former plants which are buried by the machine subject of the application, are buried in the soil in whole, which may slow their decomposition relative to the decomposition of cut stems.

Additional advantages of the present machine lie in the simplicity of achieving the purpose, small number of moving parts and save on energy and also it should be stressed that the machine subject of the invention is suitable for use with many row-growings such as e.g., cotton, corn and sun-flowers and is not restricted to a particular type of agricultural growings. In case the machine is equipped with cutting discs on the two sides of the blade which lifts the soil layer, an additional advantage is gained in a neater form of cultivation and, to some extent, saving on the power required for operating the blade.

The claimed machine is described in more detail in the appended FIGS. 1 to 3.

Identical parts are indicated by identical reference numerals in all three Figures.

Figure 1:
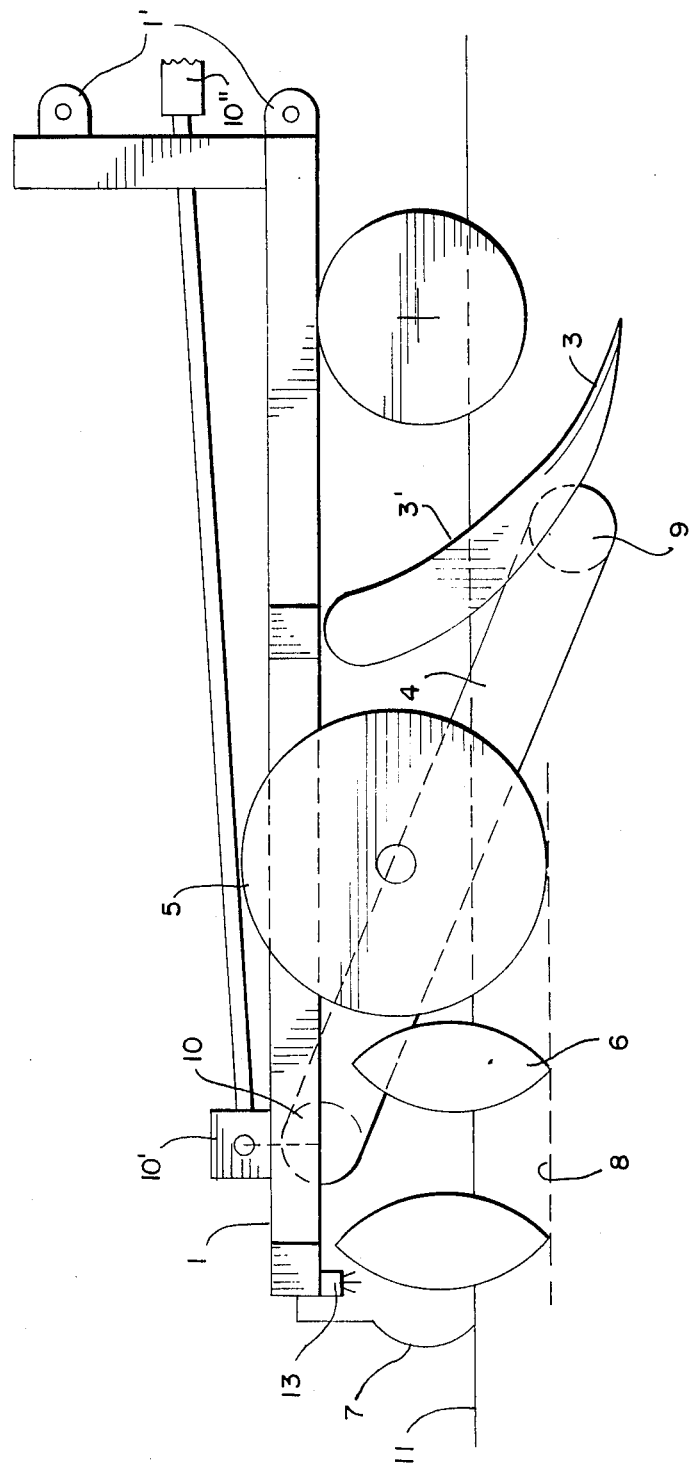
FIG. 1 illustrates a side view of a machine according to the present invention.
Figure 2:
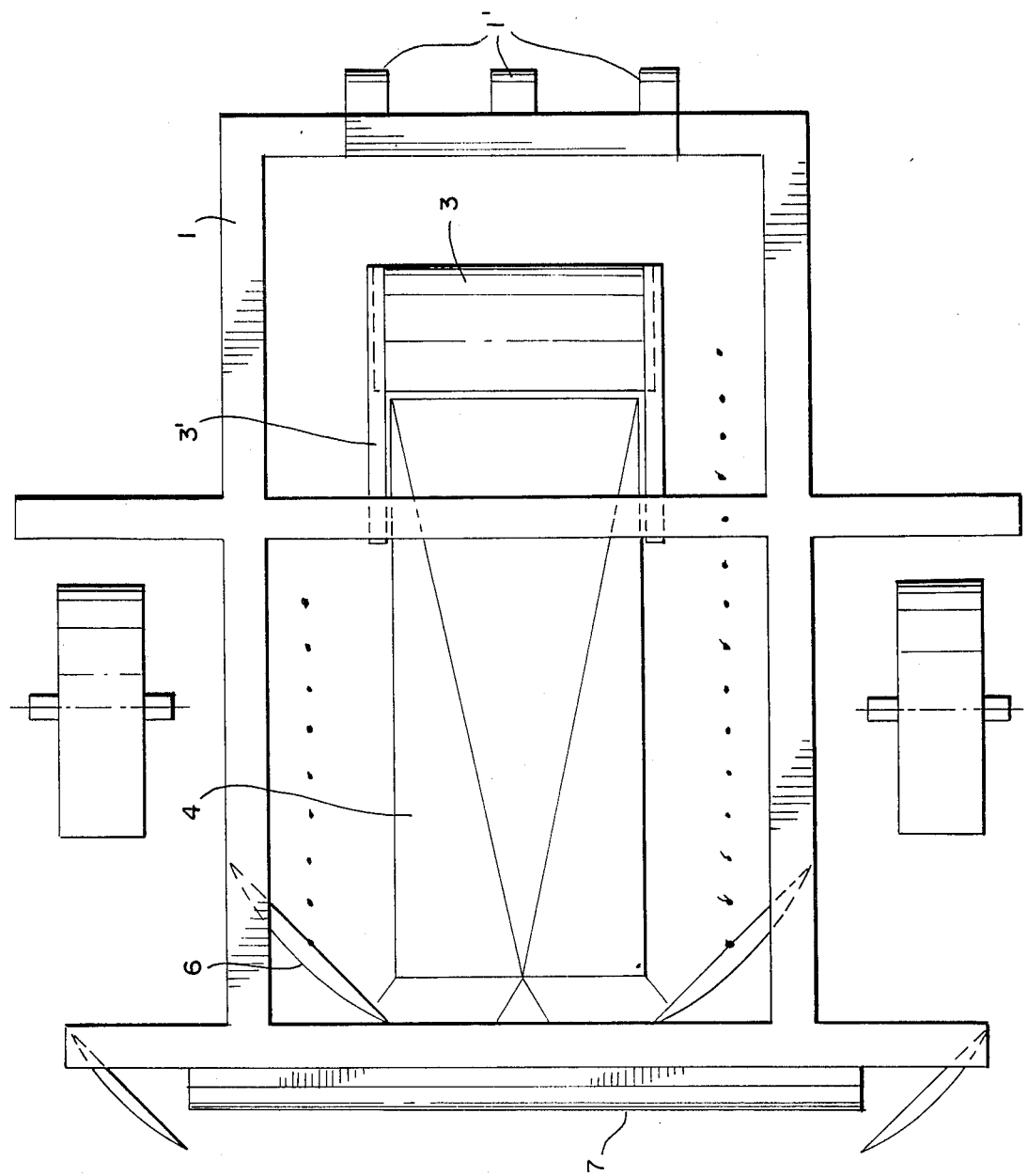
FIG. 2 illustrates a top view of a machine according to the present invention

FIGS. 1 and 2 illustrate the machine comprising a frame (1) attached to a tractor at three points (1'). On this frame (1) there is fixed a blade (3) which serves for cutting a soil layer and lifting the cut soil layer onto the conveyor (4) which moves close to the upper edge thereof. Blade (3) is held on the frame (1) by plough legs (3'), in the Figure being parabolical, attached to each other. Conveyor (4) is a conventional belt, chain, etc., conveyor, which moves about two main cylinders, an upper cylinder (10) and a lower cylinder (9), and is moved by power of the soil heaped thereon. Optionally, the conveyor's movement may be assisted by additional power means such as, e.g. a hydraulic engine or power take-off means. Such power means are well known to the man versed in the art, so FIG. 1 shows only a schematic mechanism (10') that connects the tractor's power take-off (10") to the conveyor (4).

It is naturally desirable to also use a number of auxiliary cylinders, not illustrated in the drawings. This belt is installed at a slant, the foremost end and the height of the rearmost end being adjustable to a desired height above the bed (11) by suitable means (not appearing in the drawing). The conveyor receives the cut soil layer which is lifted by the blade and transfers the same to its rearmost end which is above the bed and near to the rearmost end of the machine. From that point, this soil layer falls back into the furrow and covers the remains of the previous plants which, in the meanwhile, have been inserted into the furrow as will be described hereafter.

The means for upturning the remains of the previous plants together with the soil underneath are indicated by reference numeral (6). They may be discs which are attached at an angle to the travelling direction or also plough blades. In the Figures discs have been illustrated, also attached to frame (I), protruding to the sides in order to cover the rows of plants but obviously not reaching the height of the tractor track. These means are situated before the rearmost end of the conveyor (4) in order to enable covering (burying) of the upturned remains of the previous plants, together with the soil underneath, in the course of cutting the soil. Wheels (5) are the depth-wheels of the machine which travel in the permanent pressed track (8), which is deeper than the height of the bed (11), as indicated in FIG. 2.

Figure 3:
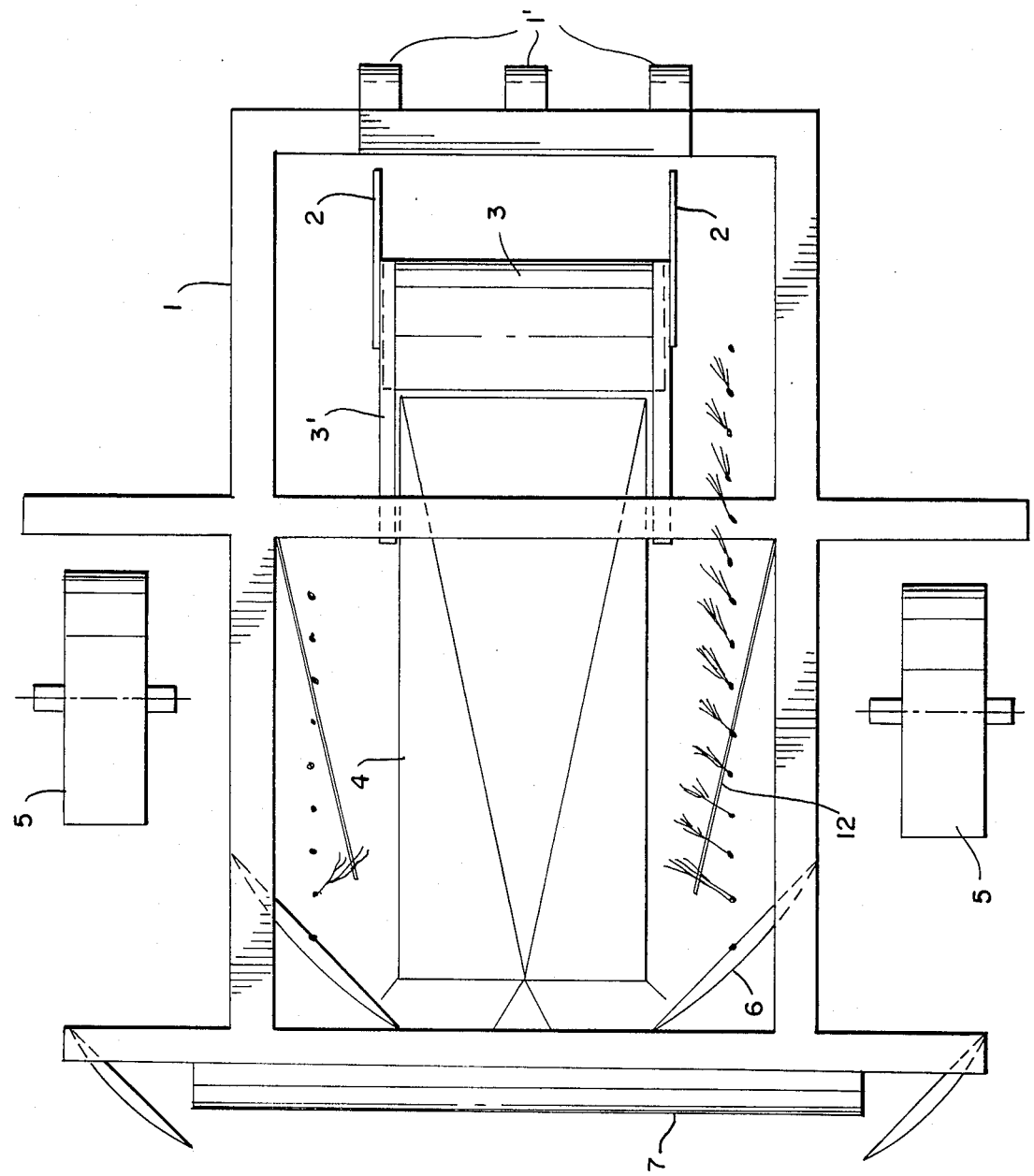
FIG. 3 illustrates a top view of a preferred embodiment of a machine according to the present invention.

FIG. 3 illustrates a top view of a preferred embodiment of a machine according to the present invention. Cutting discs (2), which are optional, are attached to the frame (this detail is clear to the man of art and therefore need not be included in the drawing). These discs serve to cut the walls of the furrow in order to more sharply define them and also reduce the load on the blade (3). Naturally these discs are arranged near the ends of blade (3).

FIG. 3 also shows also the optional means for bending the stems and other remains of previous season plants, which means are indicated by reference numeral (12). Said means may be, as illustrated in the Figure, a set of rods but it is possible to use any other suitable means.

A device for applying fertilizer to the bed of soil is schematically shown at 13 in FIG. 1.

Optionally, the machine may be equipped with means (7) for forming and straightening the surface of the bed, as the rearmost part thereof, which performs the last operation in a chronological order.

The above-described embodiments constitute examples only and the scope of the claimed protection is only defined by the appended claims.

I claim:

1. A machine which is propelled by a tractor and is used for preparing a bed of soil for sowing plants in rows, whilst burying remains of previous season plants in a method in which the tractor travels on a permanent track which remains in place from season to season, and the rows of plants are permanent from season to season, said machine comprising:
   (1) A frame attached to a tractor;
   (2) A blade held on said frame in a direction perpendicular to the machines travelling direction, said blade slanting forward in the travelling direction and reaching the desired depth of soil cultivating;
   (3) A slanted belt conveyor extending along the length of the machine, said conveyor having a forward end which is low and close to the upper edge of said blade, the conveyor having a rear end which is above the desired height of the bed, said blade and said conveyor having widths which are smaller than the distance between the rows of plants;
   (4) Means for upturning the remains of the previous season plants together with soil underneath them, said upturning means being held on said frame, overlapping the place of the rows of plants but not reaching the permanent track of the tractor and situated before the rear end of said conveyor.

2. A machine according to claim 1 wherein said convyor is provided with additional power means.

3. A machine according to claim 2 wherein said additional power means is a power take-off means of the tractor.

4. A machine according to claim 1 further comprising suitable means for adjusting the height of said rear end of the conveyor to a desired height above the surface of the bed.

5. A machine according to claim 1 wherein the previous season plants have stems, said machine further comprising means for bending the stems of the previous season plants before upturning the same.

6. A machine according to claim 1 further equipped with two cutting discs reaching a desired depth in the ground, situated on two sides of said blade.

7. A machine according to claim 1 in which said means for upturning the remains of the former plants together with the soil underneath the same are two discs reaching a desired length in the ground and arranged at an angle to the machine's travelling direction.

8. A machine according to claim 1 in which said means for upturning the remains of the previous season plants together with the soil are plough blades.

9. A machine according to claim 1 further equipped with means for levelling the bed surface, mounted beyond the rearmost end of said convyor.

10. A machine according to claim 1 further comprising means for fertilizing the bed.

* * * * *